United States Patent [19]

Brooks

[11] Patent Number: 4,607,384
[45] Date of Patent: Aug. 19, 1986

[54] FINGERPRINT CLASSIFICATION ARRANGEMENT

[75] Inventor: James A. Brooks, Hillsborough, N.J.

[73] Assignee: AT&T - Technologies, Inc., Berkeley Heights, N.J.

[21] Appl. No.: 605,826

[22] Filed: May 1, 1984

[51] Int. Cl.$^4$ .............................................. G06K 9/00
[52] U.S. Cl. ......................................... 382/4; 382/18
[58] Field of Search ............................. 382/4, 5, 2, 18

[56] References Cited

U.S. PATENT DOCUMENTS

| | | | |
|---|---|---|---|
| 3,419,287 | 12/1968 | Rudie | 382/4 |
| 3,560,928 | 2/1971 | Berger et al. | 382/4 |
| 3,959,884 | 6/1976 | Jordan et al. | 382/4 |
| 4,047,154 | 9/1977 | Vitols et al. | 382/5 |
| 4,135,147 | 1/1979 | Riganati et al. | 382/5 |
| 4,185,270 | 1/1980 | Fischer, II et al. | 382/5 |
| 4,310,827 | 1/1982 | Asai | 382/5 |

FOREIGN PATENT DOCUMENTS

8201434  4/1982  PCT Int'l Appl. ...................... 382/4

Primary Examiner—Stephen A. Kreitman
Attorney, Agent, or Firm—Kurt C. Olsen

[57] ABSTRACT

An arrangement for generating a classification code for a fingerprint having a pattern of ridges, the ridges having a plurality of reference features, which includes overlaying the intersection of a pair of cross-hairs at a first one of the reference features. A line is overlaid from a second one of the reference features to the first reference feature. The cross-hairs are oriented so that the line bisects a quadrant of the cross-hairs. The ridges crossed by predetermined portions of the cross-hairs are counted to generate the classification code.

20 Claims, 11 Drawing Figures

FIG. 1

FIG. 2
LOOP

FIG. 3
WHORL

FIG. 4
WHORL

FIG. 7
TENTED ARCH
CENTRAL SPIKE

FIG. 5

TWIN LOOP WHORL

FIG. 6

TWIN LOOP WHORL

FIG. 8

TENTED ARCH
RECURVING RIDGE

FINGERPRINT CLASSIFICATION ARRANGEMENT

BACKGROUND OF THE INVENTION

The invention relates to arrangements for classifying fingerprints for comparison and identification.

A fingerprint is an impression formed by the ridges on the under surface of a finger. The term "fingerprint" herein further includes the ridge pattern of a palm, toe, or sole, and drawings or reconstructions of faint or "latent" fingerprints.

Fingerprints are used in commerce and law enforcement for identification of individuals. Identification is achieved by comparing an unknown fingerprint with a file of reference fingerprints of known identity. For a large reference file, efficient comparison may be facilitated by sorting or classifying the fingerprints according to generalized pattern characteristics or features.

A principal feature is the global pattern formed by the ridges. Common global pattern types have been given descriptive names such as loop, whorl, and arch. Another characteristic is the local pattern formed by the ridges. The points where ridges divide or terminate are called minutiae. A core is a minutia point at the approximate center of a group of recurving or circular ridges. A delta is a minutia point at the approximate center of a group of ridges which form a Y-shape. Other features include, for example, the center of an area enclosed by a recurving ridge.

The atributes of a group of minutia points may be used to generate a classification code. In U.S. Pat. No. 4,135,147 (Riganati et al.), for example, a code for each minutia describes the position and orientation of the minutia relative to neighboring minutiae. In U.S. Pat. No. 3,419,287 (Rudie), the classification code corresponds to the coordinates of minutiae in a coordinate system.

Minutiae, especially the core and delta, also may be useful in classification schemes as reference features or fiducial points. The widely known Henry and FBI National Crime Information Center (NCIC) systems utilize a code in which a first element or descriptor specifies a pattern type, such as loop, whorl, or arch. For loop patterns, a second descriptor is included which is a count of the number of ridges between the core and delta. For whorls, the second descriptor indicates whether the ridge contour from just below the left delta is inside, outside, or meets the right delta. The Henry and NCIC systems, however, provide only a coarse classification in which many thousands of fingerprints may have the same descriptor code. A time-consuming number of comparisons therefore may be required to identify an unknown fingerprint.

It is thus an object of the invention to provide an improved fingerprint classification arrangement in which fewer fingerprints are likely to have the same descriptor codes.

SUMMARY OF THE INVENTION

The invention is directed to an arrangement for generating a classification code for a fingerprint having at least two reference features. The intersection of a pair of cross-hairs is overlaid at a first reference feature. A line is overlaid from the cross-hair intersection to a second reference feature. The cross-hairs are rotated so that the line bisects a quadrant of the cross-hairs. The number of ridges crossed by predetermined portions of the cross-hairs is counted to generate the classification code.

DETAILED DESCRIPTION

Figure 1:
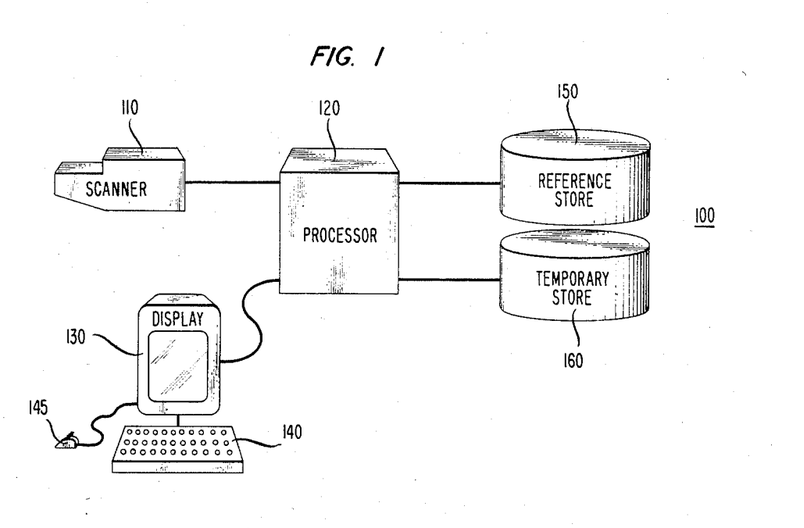
FIG. 1 shows a block diagram of a fingerprint classification and identification system useful in accordance with the invention.

FIG. 1 shows a block diagram of a man-machine interactive system suitable for classifying fingerprints according to the invention. In such a system, tasks are divided between a human fingerprint examiner and a computer according to what does best. The examiner identifies global patterns and reference feature points. The computer processes this information in accordance with the invention and stores it for efficient retrieval.

Referring to FIG. 1, system 100 comprises a scanner 110 for converting the image of a fingerprint into digital form. Scanner 110 may be the model DS-2000A made by Terminal Data Corporation, Woodland Hill, Calif. The output of scanner 110 is supplied to processor 120. Processor 120 may be a programmed general purpose digital computer such as the VAX 11/780 made by Digital Equipment Corporation (DEC), Maynard, Mass. Alternatively, the fingerprint classification and identification system may be implemented with special purpose digital hardware, as is well known in the art.

Display terminal 130 is connected to processor 120 for the visual presentation of images and text to the examiner. Terminal 130 also provides for data input and control of system 100 via keyboard 140 and an electronic pointing device such as "mouse" 145. Terminal 130 may be, for example, the model 170 CRT display terminal made by Sun Microsystems, Incorporated, Mountainview, Calif. Reference store 150 is a memory device connected to processor 120 for long term retention of fingerprint image and text data. Store 150 may be, for example, the model 7600 optical disk system made by Storage Technolgy, Incorporated, Louisville, Colo. Temporary store 160 is connected to processor 120 for short term storage of such data during classification and identification. Store 160 may be, for example, the model RAO-81 magnetic disk system made by DEC.

In order to generate a reference file of identified fingerprints, the examiner inserts a fingerprint image into scanner 110 for digitization. The examiner may also enter identifying textual information at keyboard 140. The fingerprint image and associated text are then sent to temporary store 160.

In order to classify a fingerprint, the examiner recalls an image from temporary store 160 for presentation on display 130. The examiner first identifies the global pattern type of the displayed fingerprint. The pattern types under the standard NCIC code are: Plain Arch, Tented Arch, Left Loop, Right Loop, Plain Whorl, Twin Loop Whorl, Central Pocket Loop Whorl, Lateral Pocket Loop Whorl, and Accidental Loop Whorl. The examiner inputs the pattern type to the computer via keyboard 140. Using mouse 145, the examiner indicates the location of core and delta features to the computer. At this point, classification of the fingerprint according to the invention could continue manually. Preferably, however, the computer completes the process automatically.

Figure 2:
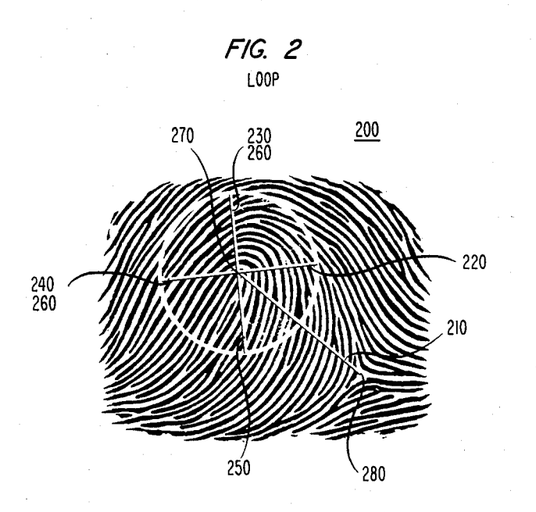
FIG. 2 illustrates the classification of a loop type fingerprint pattern in accordance with the invention.

FIGS. 2-8 illustrate the steps for completing the classification of different fingerprint pattern types in accordance with the invention. FIG. 2 is an example of a left loop type fingerprint 200. The computer places a straight line 210 between the core 270 and delta 280 points indicated by the examiner. The computer next places the intersection of a pair of cross-hairs 260 over the core of the fingerprint. Preferably, the cross-hairs are orthogonal and are equal bisectors, that is, extending for a predetermined length in all four directions from the intersection. The predetermined length may be, for example, about 20 millimeters. The cross-hairs are then rotated about the intersection so that the straight line 210 between the core and delta bisects any one of the quadrants formed by the cross-hairs. The cross-hairs preferably are oriented so that the straight line divides the quadrant into equal parts.

For each line extending outward from the core, the number of ridges crossed by the line are counted. The ridge count may proceed in a predetermined order, for example, starting with straight line 210 from the core to the delta. In FIG. 2, core to delta line 210 crosses seventeen ridges. Proceeding counter-clockwise, line 220 crosses eleven ridges. Lines 230, 240, and 250 cross ten, eight, and six ridges, respectively. The classification code in accordance with the invention for fingerprint 200 is therefore Left Loop, 17, 11, 10, 8, 6. In contrast, the classification according to the Henry and NCIC systems is just Left Loop 17. The additional ridge count descriptors provided according to the present invention are very effective in reducing the number of candidates likely to be found during a search process.

Figure 3:
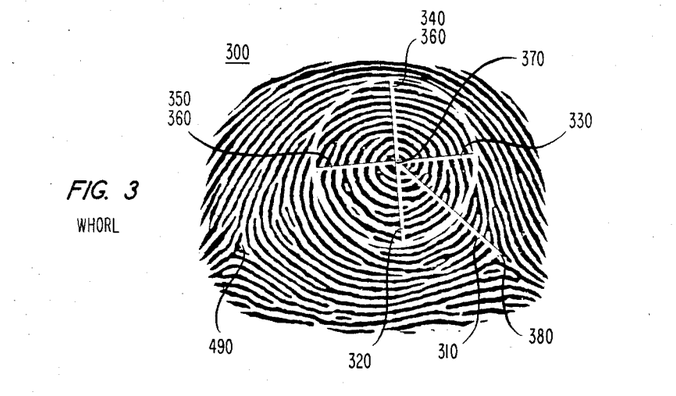
FIGS. 3 and 4 illustrate the classification of a single core, whorl type fingerprint pattern in accordance with the invention.
Figure 4:
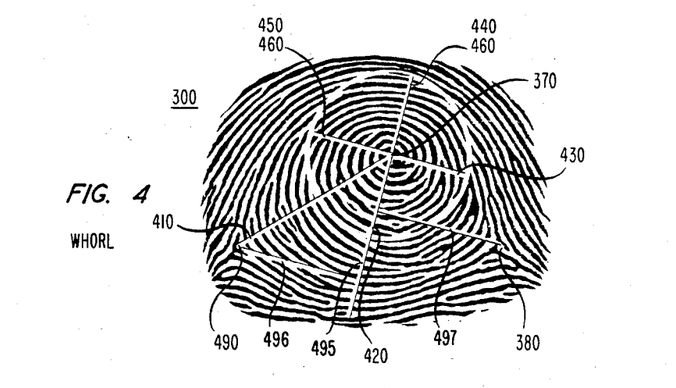

Some fingerprints, whorls in particular, may have a single core and two deltas. FIGS. 3 and 4 show the same whorl fingerprint 300 and how it is classified in accordance with the invention. The examiner identifies the core 370 and deltas 380 and 490. The computer then places a straight line between core 370 and one of the deltas. In FIG. 3, the line 310 is first placed, for example, between the right-most delta 380 and the core 370. The cross-hairs 360 are then placed at the core and oriented so that line 310 bisects one of the quadrants. Ridge counting proceeds as before starting with line 310 and continuing counter-clockwise with lines 330, 340, 350 and 320.

Referring to FIG. 4, a line 410 is plotted between the core 370 and the left delta 490. The center of cross-hairs 460 is placed at core 370 and the cross-hairs are oriented so that core-delta line 410 bisects a quadrant. Ridge counts are obtained for lines 410, 420, 430, 440 and 450. Line 420 extends from core 370 for the same length as lines 410, 430 and 440; a second line 495 begins at core 370 and extends in the same direction beyond the end of line 420. The use of line 495 (and lines 496 and 497) is detailed below. Thus far, however, the classification of fingerprint 300 is Plain Whorl 14, 9, 11, 8, 9, 19, 9, 8, 11, 8.

It will be recalled that the standard NCIC code for whorls includes a second descriptor indicating whether the ridge contour from the left delta is inside, outside or meets the right delta. In particular, this descriptor is manually obtained by tracing the first ridge found below the left delta to the right. If the first ridge terminates, the next lower ridge is followed. Upon reaching the vicinity of the right delta, the examiner determines whether the current ridge tracing meets the right delta, or is inside or outside of the delta with respect to the core.

The manual ridge tracing procedure for whorls may be replaced by the following automated arrangement in accordance with the invention. Referring to FIG. 4, line 495 is extended colinearly with line 420 from core 370. Line 496 is extended perpendicularly from line 495 to delta 490. Line 497 is extended perpendicularly from line 495 to delta 380. If the points of intersection of lines 496 and 497 with line 495 are within a predetermined variation, for example 1 millimeter, of the same distance from core 370, the fingerprint is designated as having a meeting tracing. If line 496 is closer to core 370 than line 497, the fingerprint has an inner tracing. If, as is the case in FIG. 4, line 496 is farther from core 370 than line 497, the fingerprint has an outer tracing. Therefore, the final classification of the fingerprint in FIGS. 3 and 4 in accordance with the invention is Plain Whorl, Outer Tracing 14, 9, 11, 8, 9, 19, 9, 8, 11, 8. The standard Henry and NCIC classification is simply Plain Whorl, Outer Tracing.

Figure 5:
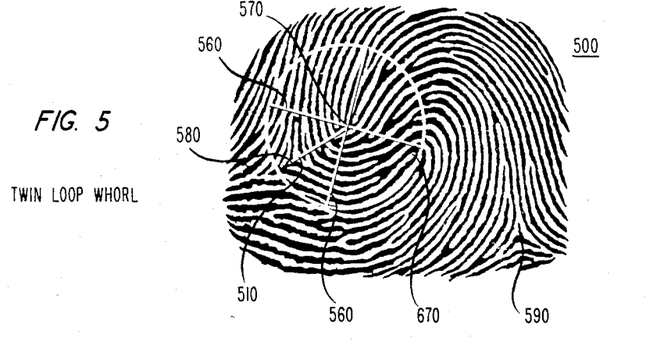
FIGS. 5 and 6 illustrate the classification of a twin loop whorl type fingerprint pattern in accordance with the invention.
Figure 6:
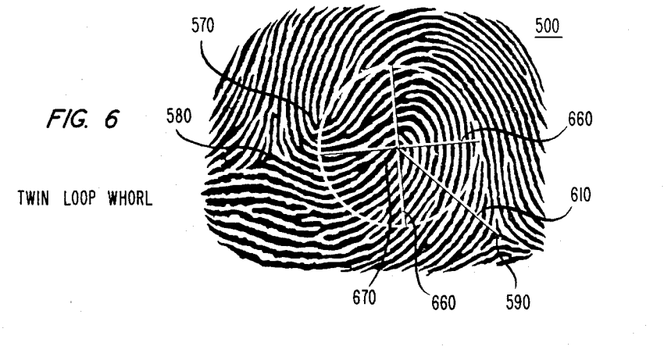

FIGS. 5 and 6 show a twin loop whorl fingerprint pattern 500 having two cores and two deltas. Cores 570 and 670, and deltas 580 and 590 are identified by the examiner. In FIG. 5, a straight line 510 is plotted from the left-most core 570 to the left-most delta 580. Cross-hairs 560 are placed at the left-most core 570 and rotated so that line 510 bisects a quadrant. Five ridge counts are obtained as described above. In FIG. 6, another set of cross-hairs 660 is placed over the right-most core 670, aligned with line 610, and an additional five ridge counts are obtained. The final classification of the fingerprint shown in FIGS. 5 and 6 is Twin Loop Whorl 5, 9, 6, 1, 9, 13, 9, 7, 2, 6. The Henry-NCIC classification is simply Twin Loop Whorl.

Figure 7:
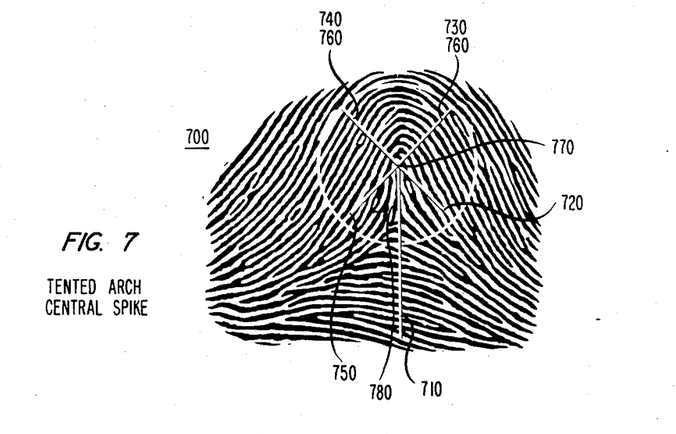
FIG. 7 illustrates the classification of a tented arch central spike type fingerprint pattern in accordance with the invention.

FIG. 7 is a tented arch fingerprint 700 which includes a central spike ridge 780. The examiner indicates the core 770 at the top of spike 780 and drops a straight line 710 down through the approximate center of the spike. The center of cross-hairs 760 is placed at the core 770. The cross-hairs are oriented so that line 710 equally partitions a quadrant. Ridge counts are determined for lines 720, 730, 740, and 750. Preferably, straight line 710 is not used for a ridge count. The classification of fingerprint 700 is Tented Arch 3, 10, 10, 3. The four ridge counts obtained according to the invention are in contrast to the Henry-NCIC standard of no ridge counts.

Figure 8:
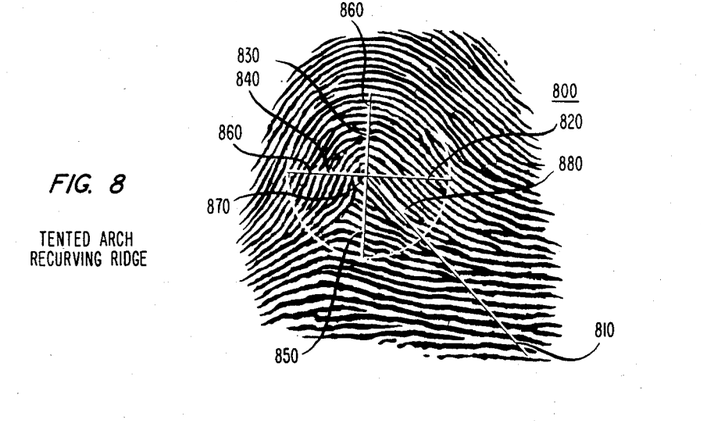
FIG. 8 illustrates the classification of a tented arch recurving ridge type fingerprint pattern in accordance with the invention.

FIG. 8 shows a tented arch fingerprint pattern 800 having a central recurving ridge 880. The examiner marks the core 870 at the top of recurving ridge 880 and drops a straight line 810 down substantially through the center of the area enclosed by ridge 880. The center of cross-hairs 860 is placed at core 870. The cross-hairs are positioned so that line 810 bisects a quadrant. Ridge counts are taken for lines 820, 830, 840, and 850. Preferably, straight line 810 is not used for a ridge count. The classification of tented arch 800 according to the invention is Tented Arch 9, 10, 10, 9. The Henry-NCIC classification is simply Tented Arch.

Figure 9:
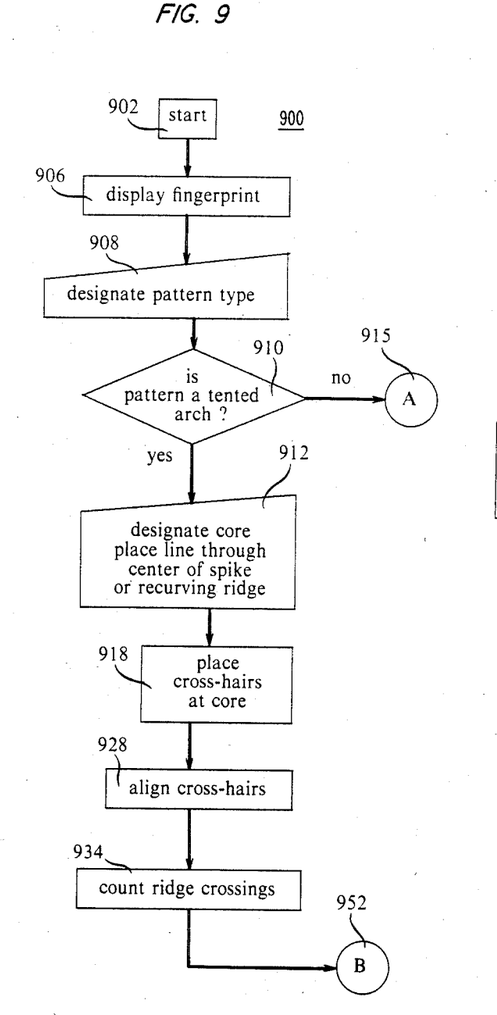
FIGS. 9, 10 and 11 show flowcharts of fingerprint classification in accordance with the invention.
Figure 10:
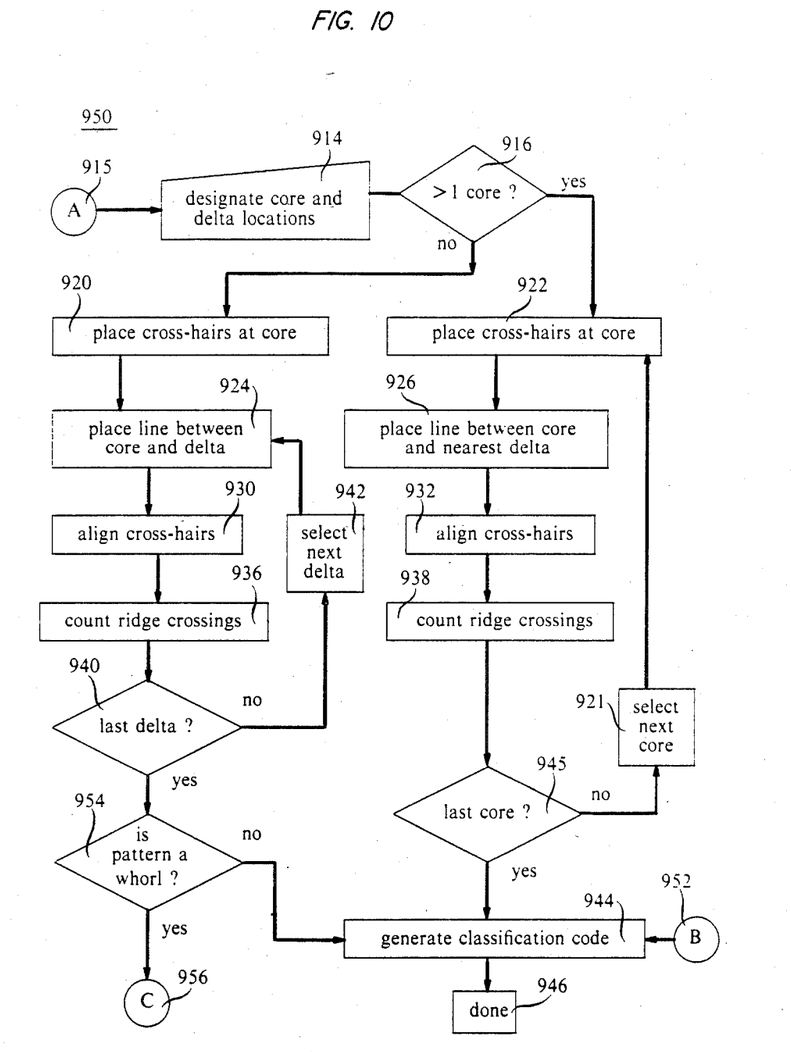
Figure 11:
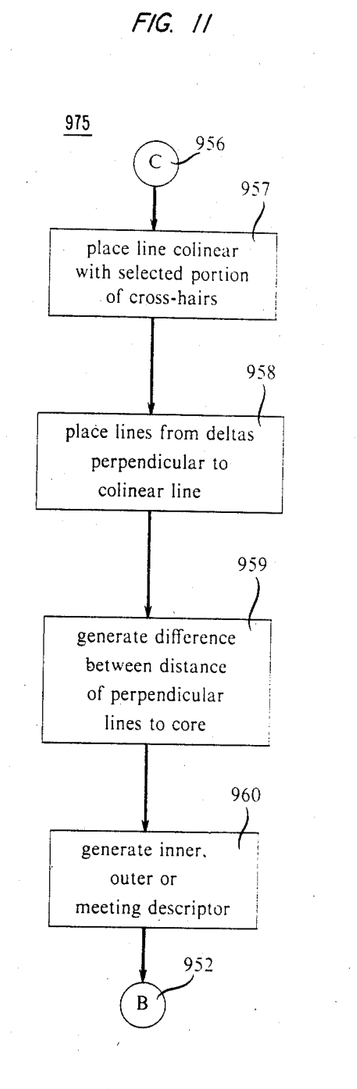

A program for implementing the invention as shown in FIGS. 1-8 may be structured, for example, in accordance with flow charts 900, 950 and 975 in FIGS. 9, 10 and 11. Flow charts 900, 950 and 975 consist of standard information processing symbols. The charts are joined by connectors A, B and C (symbols 915, 952 and 956).

Classification starts with at least one fingerprint image in store 160 in FIG. 1 (symbol 902 in FIG. 9). The image is retrieved for presentation on display 130 (symbol 906). The examiner inputs the pattern type of the fingerprint at keyboard 140 (symbol 908). If the pattern is a tented arch (symbol 910), the examiner designates the core and places a line through the center of the spike or the area enclosed by the recurving ridge (symbol 912). The intersection of a pair of cross-hairs is placed at the core (symbol 918). The cross-hairs are rotated so that the line bisects a quadrant of the cross-hairs (symbol 928). The number of ridges crossed by predetermined portions of the cross-hairs are counted (symbol 934). A classification code for the fingerprint is generated responsive to the ridge count (symbol 944 in FIG. 10) and the process terminates (symbol 946).

If the pattern is other than a tented arch (symbol 910 in FIG. 9), the examiner indicates core locations and, in addition, delta locations (symbol 914 in FIG. 10). If there is only one core (symbol 916), cross-hairs are placed at that core (symbol 920). A line is plotted between the core and a delta (symbol 924). The cross-hairs are rotated so that the line bisects a quadrant of the cross-hairs (symbols 930). The ridges crossed by the cross-hairs and the line are counted (symbol 936). If there is more than one delta (symbol 940), the next delta is seleged (symbol 942), a line is plotted (symbol 924), and the cross-hairs are aligned (symbol 930). Ridge counts are obtained for the cross-hairs and the line (symbol 936). If the last delta has been processed (symbol 940) and the pattern is not a whorl (symbol 954), a classification code is generated (symbol 944) and the program terminates (symbol 946).

If the pattern is a whorl (symbol 954 in FIG. 10), a line is extended from the core colinear with a selected portion of the cross-hairs (symbol 957 in FIG. 11). Lines are extended from the left and right deltas to meet the colinear line perpendicularly (symbol 958). A signal is generated corresponding to the difference between the distances from the core to the meeting points of the left and right delta lines on the colinear line (symbol 959). Responsive to the difference signal, a descriptor is generated indicating whether the pattern has an inner, outer or meeting tracing (symbol 960). A classification code is generated (symbol 944 in FIG. 10) and the process ends (symbol 946).

If there is more than one core (symbol 916), the cross-hairs are placed at a selected core (symbol 922). A line is directed between the core and the nearest delta (symbol 926) and the cross-hairs are oriented so that the line bisects a quadrant (symbol 932). Ridges traversed by the cross-hairs and the line are counted (symbol 938). If there is another core (symbol 945), it is selected (symbol 921). The cross-hairs are placed at the newly selected core (symbol 922), and a line is placed between the core and nearest delta (symbol 926). The cross-hairs are aligned (symbol 932) and ridge counts are taken for the cross-hairs and line (symbol 938). If the last core has been processed (symbol 945), the classification code is generated (symbol 944) and the process is done (symbol 946).

The invention has been described with reference to an illustrative embodiment. Various modifications may be made by one skilled in the art without departing from the scope and spirit of the invention. For example, the location of core and delta points, and the designation of global pattern types may be accomplished alternatively by automated processes.

I claim:

1. A method of generating a classification code for a fingerprint having a pattern of ridges, the ridges including a plurality of reference features, comprising
    overlaying the intersection of a pair of cross-hairs at a first reference feature,
    overlaying a line between a second reference feature and the first reference feature,
    rotating the cross-hairs so that the line bisects a quadrant of the cross-hairs,
    counting the number of ridges crossed by predetermined portions of the cross-hairs, and
    generating the classification code responsive to said ridge counting step.

2. The method of claim 1 wherein the fingerprint is a loop pattern, and said reference features comprise a core and a delta,
    said cross-hair overlaying step comprises overlaying the intersection of the cross-hairs at the core,
    said line overlaying step comprises overlaying the line between the delta and the core, and
    said ridge counting step comprises counting the number of ridges crossed by the line between the core and the delta, and for each predetermined portion of the cross-hairs, counting the number of ridges crossed by the predetermined portion.

3. The method of claim 1 wherein the fingerprint is a whorl pattern, and said reference features comprise a core, and first and second deltas,
    said cross-hair overlaying step comprises overlaying the intersection of the cross-hairs at the core,
    said line overlaying step comprises overlaying a first line between the core and the first delta, and overlaying a second line between the core and the second delta, and
    said cross-hair rotating step and said ridge counting step comprise
    rotating the cross-hairs so that the first line bisects a quadrant of the cross-hairs, counting the number of ridges crossed by the first line, and for each predetermined portion of the cross-hairs, counting the number of ridges crossed by the predetermined portion, and
    rotating the cross-hairs so that the second line bisects a quadrant of the cross-hairs, counting the number of ridges crossed by the second line, and for each predetermined portion of the cross-hairs, counting the number of ridges crossed by the predetermined portion.

4. The method of claim 3 wherein the first delta is the left delta and the second delta is the right delta, and said classification code generating step further comprises
    selecting the first portion of the cross-hairs which lies in a counter-clockwise direction from the first line between the core and the left delta,
    overlaying a third line fromt he core colinear with said selected portion of the cross-hairs, overlaying a fourth line perpendicular to the third line, said fourth line extending from the left delta to the third line, overlaying a fifth line perpendicular to the third line, said line extending from the right delta to the third line, generating a difference signal corresponding to the difference between the distance from the intersection of the third and fourth lines to the core and the distance from the intersection of the third and fifth lines to the core, and generating a descriptor responsive to the difference signal, said descriptor being indicative of the relative position of the left delta with respect to the right delta.

5. The method of claim 1 wherein the fingerprint is a twin loop whorl pattern, and said reference features comprise first and second cores, and first and second deltas;

said cross-hair overlaying step comprises overlaying the intersection of a first pair of cross-hairs at the first core, and overlaying the intersection of a second pair of cross-hairs at the second core;

said line overlaying step comprises overlaying a first line between the first core and the first delta, and overlaying a second line between the second core and the second delta;

said cross-hair rotating step comprises rotating the first pair of cross-hairs so that the first line bisects a quadrant of the first pair of cross-hairs, and rotating the second pair of cross-hairs so that the second line bisects a quadrant of the second pair of cross-hairs; and said ridge counting step comprises counting the number of ridges crossed by the first line, counting the number of ridges crossed by the second line, and for each predetermined portion of the first and second cross-hairs, counting the number of ridges crossed by the predetermined portion.

6. The method of claim 1 wherein the fingerprint is a tented arch pattern having a central spike, said first reference feature is the top end of the central spike, and said second reference feature is substantially the center of the central spike, whereby said line overlaid between the first and second reference features is substantially colinear with the central spike.

7. The method of claim 1 wherein the fingerprint is a tented arch pattern having a recurving ridge, said first reference feature is the top end of the recurving ridge, and said second reference feature is substantially the center of the area enclosed by the recurving ridge, whereby said line overlaid between the first and second reference features bisects the area enclosed by the recurving ridge.

8. The method of claim 1 wherein the angle formed by the intersection of the cross-hairs is substantially 90 degrees.

9. The method of claim 1 wherein there are four predetermined portions of the cross-hairs, each portion extending for a predetermined length away from the intersection in a different direction.

10. The method of claim 9 wherein the length of each of the predetermined portions of the cross-hairs is about 20 millimeters.

11. Apparatus for generating a classification code for a fingerprint having a pattern of ridges, the ridges including a plurality of reference features, comprising means for overlaying the intersection of a pair of cross-hairs at a first reference feature, means for overlaying a line between a second reference feature and the first reference feature, means for rotating the cross-hairs so that the line bisects a quadrant of the cross-hairs, means for counting the number of ridges crossed by predetermined portions of the cross-hairs, and means for generating the classification code responsive to said ridge counting step.

12. The apparatus of claim 11 wherein the fingerprint is a loop pattern, and said reference features comprise a core and a delta, said cross-hair overlaying means comprises means for overlaying the intersection of the cross-hairs at the core, said line overlaying means comprises means for overlaying the line between the delta and the core, and said ridge counting means comprises means for counting the number of ridges crossed by the line between the core and the delta, and for each predetermined portion of the cross-hairs, means for counting the number of ridges crossed by the predetermined portion.

13. The apparatus of claim 11 wherein the fingerprint is a whorl pattern and said reference features comprise a core, and first and second deltas, said cross-hair overlaying means comprises means for overlaying the intersection of the cross-hairs at the core, said line overlaying means comprises means for overlaying a first line between the core and the first delta, and means for overlaying a second line between the core and the second delta, and said cross-hair rotating means and said ridge counting means comprise means for rotating the cross-hairs so that the first line bisects a quadrant of the cross-hairs, means for counting the number of ridges crossed by the first line, and for each predetermined portion of the cross-hairs, means for counting the number of ridges crossed by the predetermined portion, and means for rotating the cross-hairs so that the second line bisects a quadrant of the cross-hairs, means for counting the number of ridges crossed by the second line, and for each predetermined portion of the cross-hairs, means for counting the number of ridges crossed by the predetermined portion.

14. The apparatus of claim 13 wherein the first delta is the left delta and the second delta is the right delta, and said classification code generating means further comprises means for selecting the first portion of the cross-hairs which lies in a counter-clockwise direction from the first line between the core and the left delta, means for overlaying a third line from the core colinear with said selected portion of the cross-hairs, means for overlaying a fourth line perpendicular to the third line, said fourth line extending from the left delta to the third line, means for overlaying a fifth line perpendicular to the third line, said fifth line extending from the right delta to the third line, means for generating a difference signal corresponding to the difference between the distance from the intersection of the third and fourth lines to the core and the distance from the intersection of the third and fifth lines to the core, and means for generating a descriptor responsive to the difference signal, said descriptor being indicative to the relative position of the left delta with respect to the right delta.

15. The apparatus of claim 11 wherein the fingerprint is a twin loop whorl pattern, and said reference features comprise first and second cores, and first and second deltas;

said cross-hair overlaying means comprises means for overlaying the intersection of a first pair of cross-hairs at the first core, and means for overlaying the intersection of a second pair of cross-hairs at the second core;

said line overlaying means comprises means for overlaying a first line between the first core and the first delta, and means for overlaying a second line between the second core and the second delta;

said cross-hair rotating means comprises means for rotating the first pair of cross-hairs so that the first line bisects a quadrant of the first pair of cross-hairs, and means for rotating the second pair of cross-hairs so that the second line bisects a quadrant of the second pair of cross-hairs; and said ridge counting means comprises means for counting the number of ridges crossed by the first line, means for counting the number of ridges crossed by the second line, and for each predetermined portion of the first and second cross-hairs, means for counting the number of ridges crossed by the predetermined portion.

16. The apparatus of claim 11 wherein the fingerprint is a tented arch pattern having a central spike, said first reference feature is the top end of the central spike, and said second reference feature is substantially the center of the central spike, whereby said line overlaid between the first and second reference features is substantially colinear with the central spike.

17. The apparatus of claim 11 wherein the fingerprint is a tented arch pattern having a recurving ridge, said first reference feature is the top end of the recurving ridge, and said second reference feature is substantially the center of the area enclosed by the recurving ridge, whereby said line overlaid between the first and second reference features bisects the area enclosed by the recurving ridge.

18. The apparatus of claim 11 wherein the angle formed by the intersection of the cross-hairs is substantially 90 degrees.

19. The apparatus of claim 11 wherein there are four predetermined portions of the cross-hairs, each portion extending for a predetermined length away from the intersection in a different direction.

20. The apparatus of claim 19 wherein the length of the predetermined portion of the cross-hairs is about 20 millimeters.

* * * * *